United States Patent [19]

Percivalle et al.

[11] Patent Number: 4,712,457

[45] Date of Patent: Dec. 15, 1987

[54] APPARATUS AND METHOD FOR CUTTING WINDOW SHADES

[75] Inventors: Glenn S. Percivalle, Warwick; Ronald L. Blanchette, Johnston, both of R.I.

[73] Assignee: Kenney Manufacturing Company, Warwick, R.I.

[21] Appl. No.: 876,928

[22] Filed: Jun. 20, 1986

[51] Int. Cl.[4] .......... B23B 3/26; B23B 5/14

[52] U.S. Cl. .......... 82/47; 82/63; 82/99 A

[58] Field of Search .......... 82/47, 48, 63, 70.2, 82/101, 92, 99 A

[56] References Cited

U.S. PATENT DOCUMENTS

| | | | |
|---|---|---|---|
| 3,494,230 | 2/1970 | Gast | 82/101 |
| 3,715,940 | 2/1973 | Davis | 82/63 |
| 3,760,664 | 9/1973 | Gossling | 82/63 |
| 3,933,090 | 1/1976 | Reynolds | 82/48 |
| 4,512,224 | 4/1985 | Terauchi | 82/48 |
| 4,589,312 | 5/1986 | Meyers et al. | 82/48 |
| 4,589,313 | 5/1986 | Meyers et al. | 82/48 |

*Primary Examiner*—Nicholas P. Godici
*Attorney, Agent, or Firm*—Russell & Tucker

[57] ABSTRACT

The present invention relates to a device for and method of cutting vinyl window shades mounted on a roller. The device includes jaws for clamping the roller to stabilize it during the cutting operation, a blade fixed to a wheel that revolves around the roller and that is drawn toward the roller by centrifugal force as the wheel revolves, a device for stopping the wheel if the cutting blade contacts a metal shade roller, and another device for stopping the wheel if the blades travels a predetermined distance.

5 Claims, 6 Drawing Figures

APPARATUS AND METHOD FOR CUTTING WINDOW SHADES

FIELD OF THE INVENTION

The present invention relates to a device for cutting window shades to a desired length, and in particular to an automatically controlled device that is adapted to be set up in a retail store for use by customers without assistance from store personnel.

BACKGROUND OF THE INVENTION

The general practice in the window shade industry is to manufacture window shades in only broad increments of lengths and have those lengths cut to the specific size required by the consumer at the time of sale. In today's market, the shade material itself is usually cloth or vinyl (plain or reinforced), and the rollers upon which the vinyl shades are wrapped are either convolute cardboard or telescoping metal tubes.

There is only a minimum of standardization of the rollers with regard to size or material, and heretofore there has not been available a machine that is both versatile enough to cut vinyl shades wrapped on either metal or convolute cardboard rollers and simple enough to be safely used by the general public without assistance from store personnel. Most of the in-store shade cutting machines have exposed moving parts and tend to be too complex and dangerous to be safely operated by the general public to operate.

One prior cutting machine employs shielded moving parts and is able to automatically cut vinyl shades relatively safely. However, it is only useable for shades mounted on convolute cardboard rollers, and thus lacks the versatility necessary for widespread general use.

One problem with shielding the moving parts is that it makes it difficult to load and control the machine. The prior art machines have lacked adequate sensing features and controls.

Another attempt to solve the problem is described in U.S. Pat. No. 4,006,770, in which a strippable vinyl shade has vertical score lines in it to allow the consumer to peel away the portion of the shade that is not needed. Such "peel-to-width" shades, however, have the disadvantage that they can employ only unreinforced vinyl film, the score lines tend to promote unwanted rupture, and are noticeable when the shade is rolled up.

OBJECTS OF THE INVENTION

In view of the foregoing limitations of the known devices for cutting window shades, as well as other disadvantages not specifically mentioned above, a need has existed for many years in the art for a versatile device for cutting vinyl window shades that is safe enough to be used by the general public without assistance from store personnel.

It is, therefore, a primary object of this invention to fulfill that need by providing an "idiot proof" safe and versatile device for cutting window shades suitable for use by ordinary customers in a store without assistance of store personnel.

More particularly, it is an object of the invention to provide a window shade cutting device that is able to cut vinyl shades that are wrapped on either convolute cardboard or metal telescoping tubes without having to adjust the machine to accommodate the two types of tubes.

It is a further object of the invention to provide a device for cutting window shades that will automatically shut off when the cutting blade has cut through the shade material and a predetermined depth increment.

It is yet another object of the invention to provide a device for cutting vinyl window shades that will automatically shut off when the cutting blade has cut through the vinyl shade and contacts a metal roller.

It is still another object of the present invention to provide a device for cutting vinyl window shades that will automatically shut off after a predetermined period of time.

Yet another object of the present invention is to provide a device for cutting vinyl window shades that can be easily adjusted and operated by an untrained operator.

Still another object of the present invention is to provide a vinyl shade cutting device wherein the moving parts are shielded from the user, and yet the device is still easy to load and control.

Another object of the present invention is to provide a device for cutting vinyl window shades that is safe enough to allow the general public to operate it without training or supervision.

BRIEF DESCRIPTION OF THE INVENTION

Briefly described, the aforementioned objects are accomplished according to the present invention by providing a cutting device that includes a pair of clamping jaws and a cutting blade contained within a housing. The housing has an opening in one side through which a user inserts the end of a vinyl shade that is to be trimmed and positions the shade at the desired length on a fixed scale. When the machine is turned on, a unique cam and gear arrangement causes the jaws to clamp down on the shade in the correct position, and to stabilize it during cutting. When the jaws are firmly clamping the shade, a signal is sent to the blade operating motor to begin cutting the shade.

Three independent controls are arranged to shut off the blade operating motor and stop the cutting process. The first shut off control is a continuity tester that is able to determine if the cutting blade has come in contact with a metal roller upon which the vinyl shade is wrapped. Once such contact is made, the blade is allowed to continue for one full revolution around the roller after which it is quickly stopped. Another control senses how far the cutting blade has travelled radially inwardly toward the axis of the shade and shuts off the blade operating motor once the blade has travelled a specific distance. The latter control is useful when cutting shades mounted on convolute cardboard or other nonconductive rollers. The third control operates automatically to stop the blade operating motor if the motor has been running longer than a predetermined time.

BRIEF DESCRIPTION OF THE DRAWINGS

These and other objects, advantages and features of the invention will become hereinafter apparent, and the nature of the apparatus of the invention will be more clearly understood by reference to the following detailed description thereof, the appended claims and to the several views illustrated in the attached drawings, in which:

DETAILED DESCRIPTION OF A PREFERRED EMBODIMENT

Figure 1:
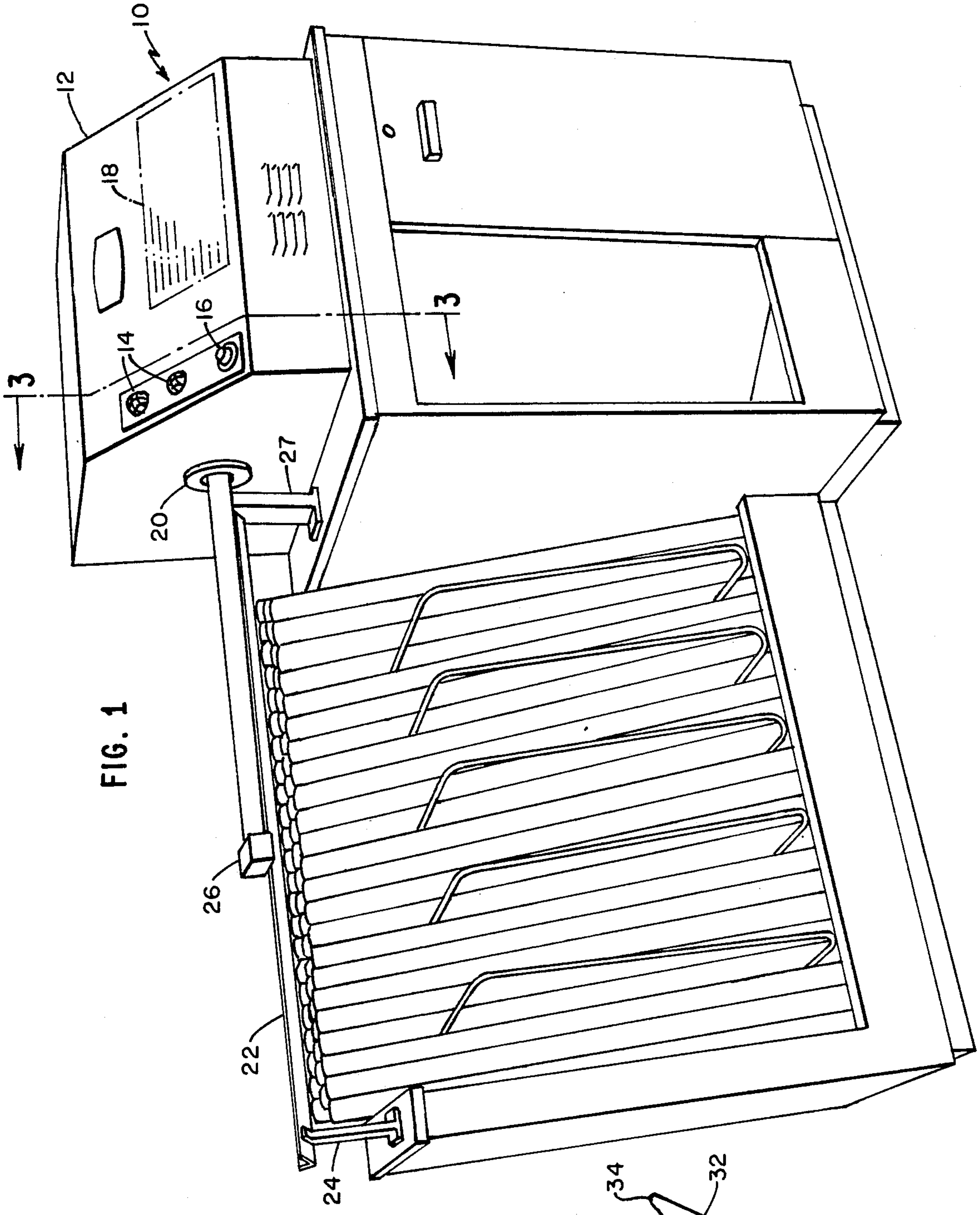
FIG. 1 is a perspective view of the shade cutting machine according to the present invention.

Referring now in detail to the drawings wherein like parts are designated by like reference numeral, there is illustrated in FIG. 1 a perspective view of the shade cutting machine 10 according to the present invention.

Shown in FIG. 1 is a housing 12 that protects the machine user from all dangerous or moving parts. Mounted on the housing 12 are "ready" and "in-use" indicator lights 14 and a start button 16. Adjacent the indicator lights 14 and start button 16 is a panel 18 upon which directions may be printed. On one side of the housing is an opening 20 into which the end of the shade to be cut is inserted. A V-shaped support 22 is mounted on legs 24, and is arranged such that when the shade to be cut is placed into the V, the shade is in alignment with the opening 20 and the cutting apparatus inside the housing.

Figure 2:
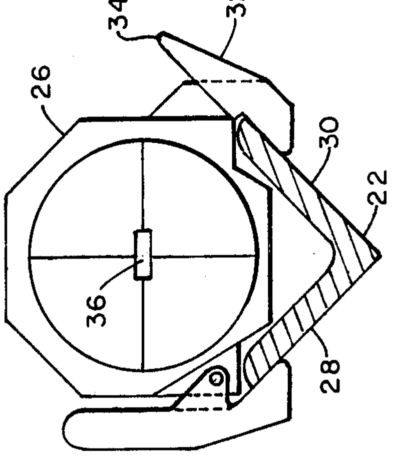
FIG. 2 is an end view of the carriage assembly that holds one end of the shade roller.

A carriage assembly 26 is mounted on the V-shaped support 22, and is shown in greater detail in FIG. 2. The assembly 26 has a fixed groove 28 on one side thereof, and an open sided groove 30 on the other side. A spring activated arm 32 is mounted on the carriage to close the open groove 30 and to be biased against the V-shaped support 22 in its relaxed position. When the top end 34 of the arm 32 is pressed toward the carriage assembly 26, the arm 32 is lifted off of the support 22 and the assembly 26 is then free to slide along the support 22.

To place a shade and roller into the machine, the wall bracket engaging metal tab portion that extends from one end of the shade roller is inserted into opening 36 of carriage assembly 26. While depressing arm 32, the carriage assembly is then adjusted along the support 22 to set the machine for the desired length of the shade. Graded markings can be placed on the support 22 to facilitate determining the finished length of the roller.

Figure 3:
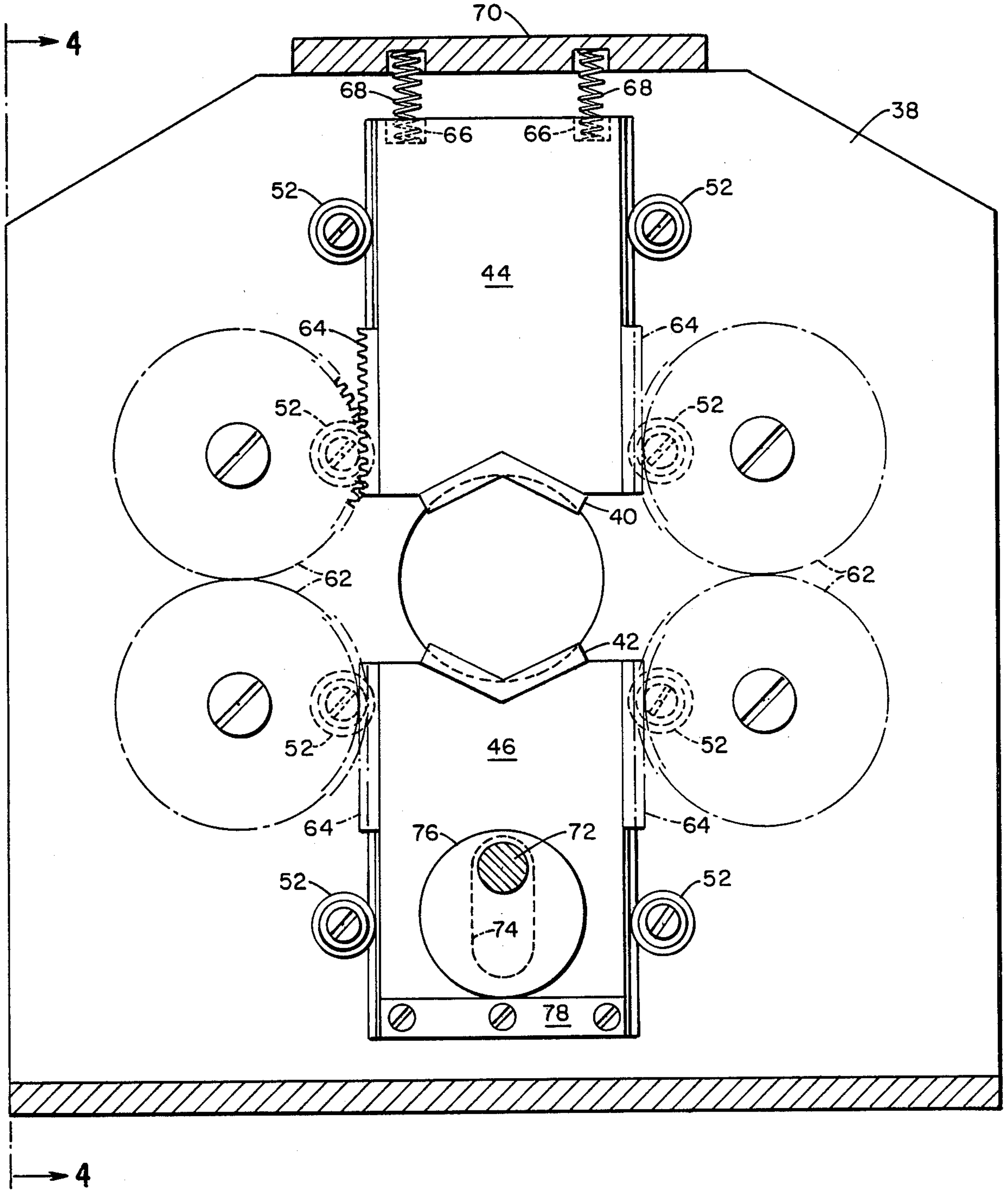
FIG. 3 is a view of the inside of the shade cutting machine of the present invention taken along line 3—3 of FIG. 1.
Figure 4:
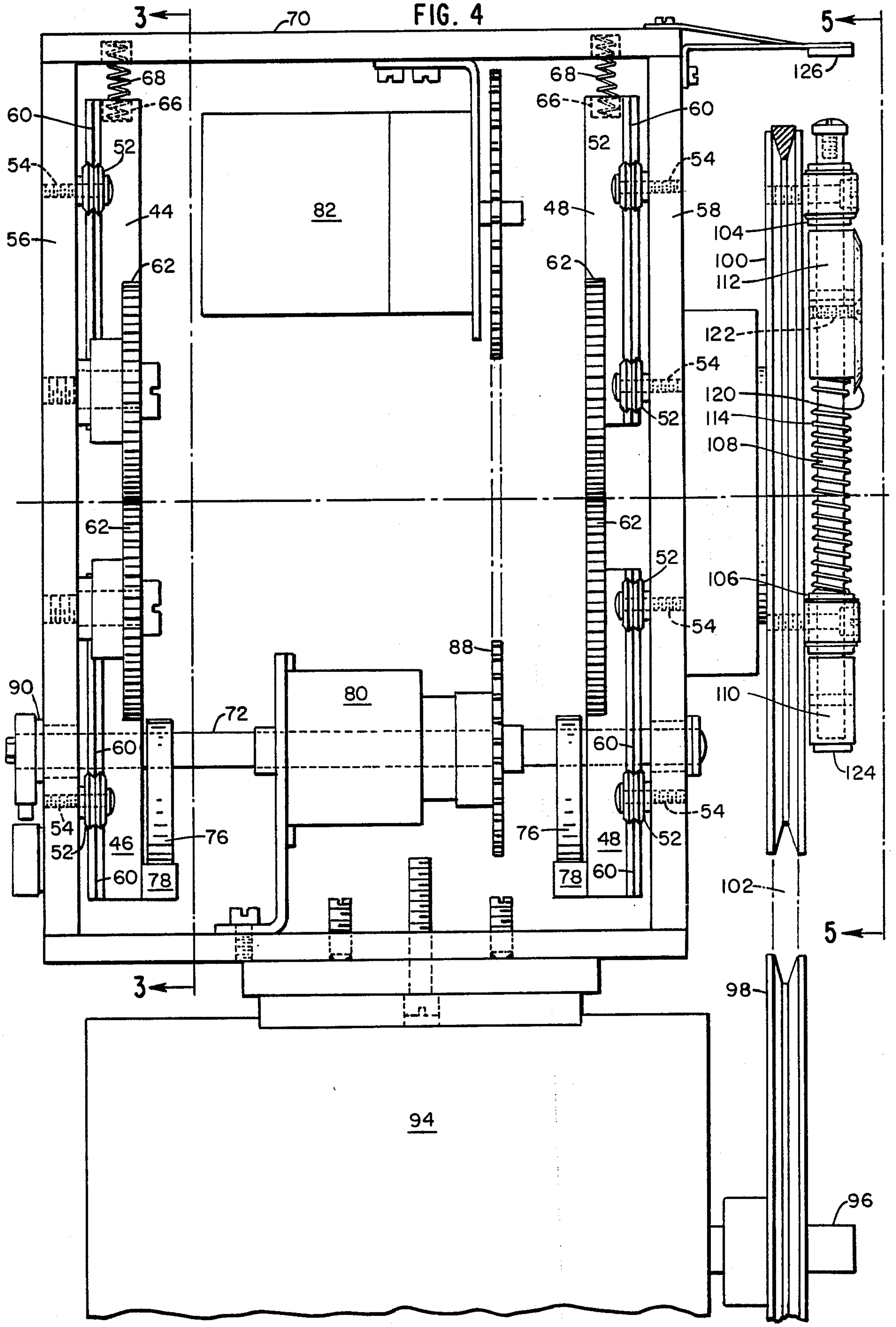
FIG. 4 is an view of the shade cutting machine of the present invention taken along line 4—4 of FIG. 3.

Turning attention now to FIG. 3, the inside of the cutting device may be seen. Jaws 40 and 42 are made from an elastomeric material, such as neoprene, and are mounted on mounting plates 44 and 46 to clamp the shade roller during the cutting operation. A second pair of mounting plates 48, 50 are shown in FIG. 4. Although not shown in the drawings, there is a second pair of jaws similarly mounted on plates 48, 50.

Rollers 52 are mounted on shafts 54 to walls 56 and 58. The mounting plates 44, 46, 48, 50 have tracks 60 which engage with rollers 52 to enable the plates to move vertically with respect to the walls 56, 58.

Gears 62 are also mounted to walls 56, 58 with shafts. Gears 62 engage not only with each other, but also with toothed racks 64 fixed to each side of mounting plates 44, 46, 48, 50. As a result of the gear arrangement, vertical movement of one mounting plate is transmitted through gears 62 to create an equal but opposite movement in the other mounting plate.

The upper mounting plates 44, 48 each have two small bores 66 in the top surface thereof. Compression coil springs 68 are located within bores 66 and press against roof plate 70 to provide a constant downward force on the upper mounting plates 44, 48. This downward force is transmitted via gears 62 to provide an equal upward force on mounting plates 46, 50. These forces act to retain the clamping jaws 40, 42 against the shade roller being cut when the machine is operating.

In order to overcome the force of the springs 68, an opening mechanism is incorporated. A shaft 72 is mounted with bearings to walls 56, 58 so as to allow free rotation of the shaft 72, which passes through an elliptical opening 74 in each of the lower mounting plates 46, 50. Cams 76 are rigidly mounted to shaft 72 so as to rotate therewith. A block 78 extends from the base of each lower mounting plate 46, 50 so as to be in alignment with the cams 76. When the shaft 72 and cams 76 are in the position shown in FIGS. 3 and 4, i.e., with the large portion of the cams 76 pressing against the blocks 78, the cams 76 operate against the compression springs 68 to hold the jaws 40, 42 in an open position. When the shaft 72 and cams 76 are rotated one-half of a revolution, the springs 68 cause the mounting plates and jaws to close.

A clutch 80, such as a Marquette industrial clutch-brake package, interconnects motor 82 with shaft 72 via a chain 84 that is mounted on gear pulleys 86, 88. A cam 90 is connected to shaft 72 and rotates therewith. The cam 90 triggers a switch 92 that sends a signal indicating that the shaft 72 and the cams 76 are in such a position that the jaws are clamped in the closed position.

Figure 5:
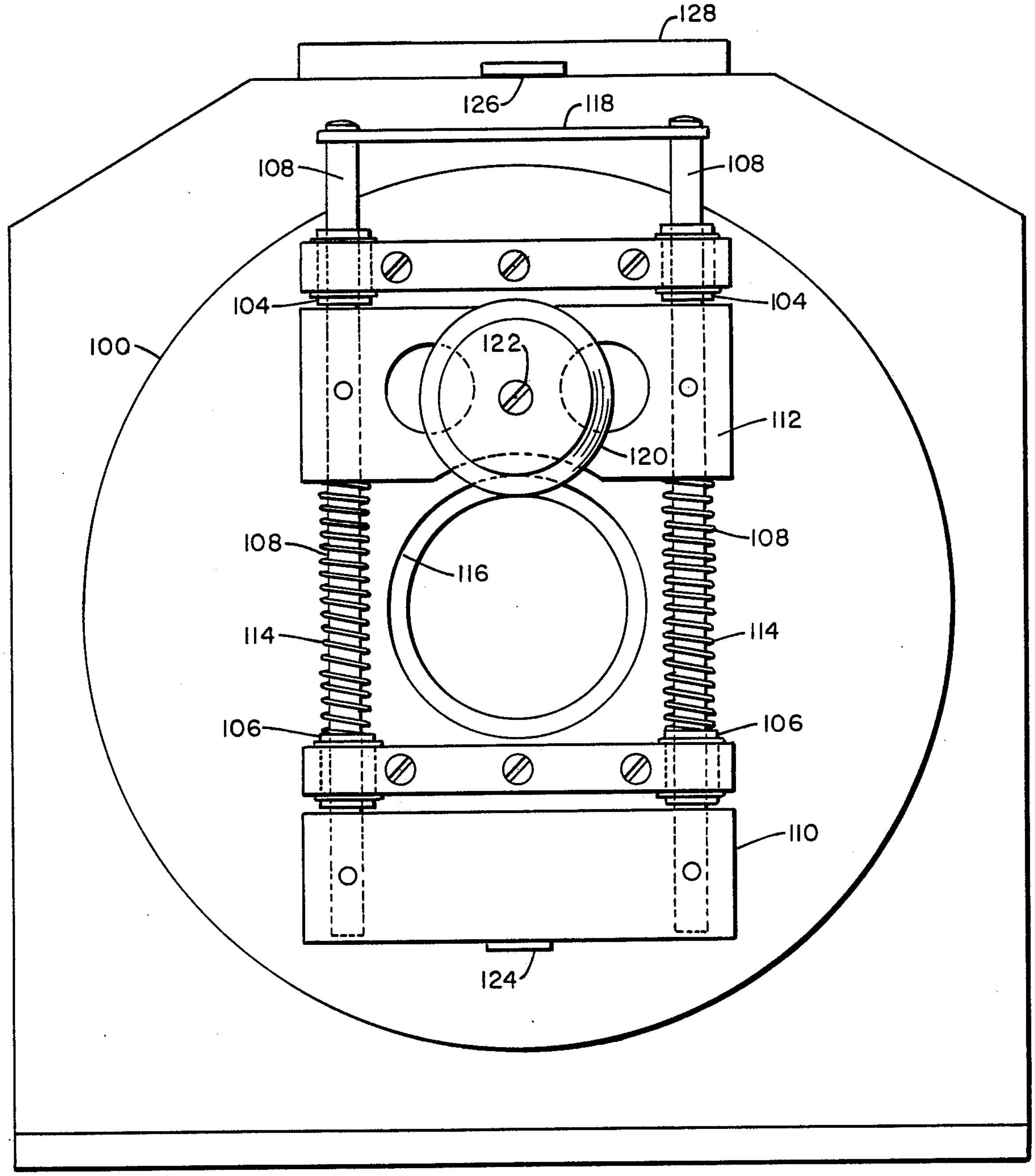
FIG. 5 is an view of the cutting blade taken along line 5—5 of FIG. 4.

Turning attention to FIGS. 4 and 5, the operation of the cutting blade will be described. A motor 94 is mounted to a shaft 96, which in turn drives pulley 98. Pulley 98 is connected to a large pulley wheel 100 by a belt 102. Wheel 100 has four mounting blocks 104, 106 integrally attached thereto. Each of the blocks 104, 106 has a smooth bore extending therethrough and shafts 108 extend through the bores in the blocks 104, 106. A weight 110 is affixed to one end of the shafts 108. Between the two sets of blocks 104, 106 a blade holder 112 is mounted on the shafts 108 between blocks 104 and 106.

Springs 114 are coiled around shafts 108 and act between blocks 106 and blade holder 112 to urge the blade holder 112 outwardly, away from the center of the wheel 100. At the center of the wheel 100 is an opening 116 through which the end of the vinyl shade to be trimmed is inserted. A plate 118 is mounted across the opposite ends of shafts 108 to prevent the blade holder from travelling too far toward the center opening 116. A circular blade 120 is bolted to the blade holder 112 with a bolt 122.

As the wheel 100 is rotated by motor 94, the weight 110 is pulled outwardly against springs 114 by centrifugal force. Since weight 110 and blade holder 112 are both fixed to the shafts 108, the outward movement of the weight 110 draws the blade 120 toward the center of the wheel 100, where it can cut the vinyl shade.

There are three operation interruption control devices, each of which stops motor 94 from driving wheel 100 which by eliminating the centrifugal force allows springs 114 to urge the blade 120 back from the center opening 116. The first control device comprises a pair of proximity sensors 124, 126, one of which is located on the weight 110, and the other is located on the main frame 128. When the weight 110 has travelled a predetermined distance outwardly, the two proximity sensors 124, 126 are activated, sending a signal to stop the motor 94. The predetermined distance is calculated to stop the motor when the blade has travelled a distance sufficient to cut through a convoluted cardboard roller.

Figure 6:
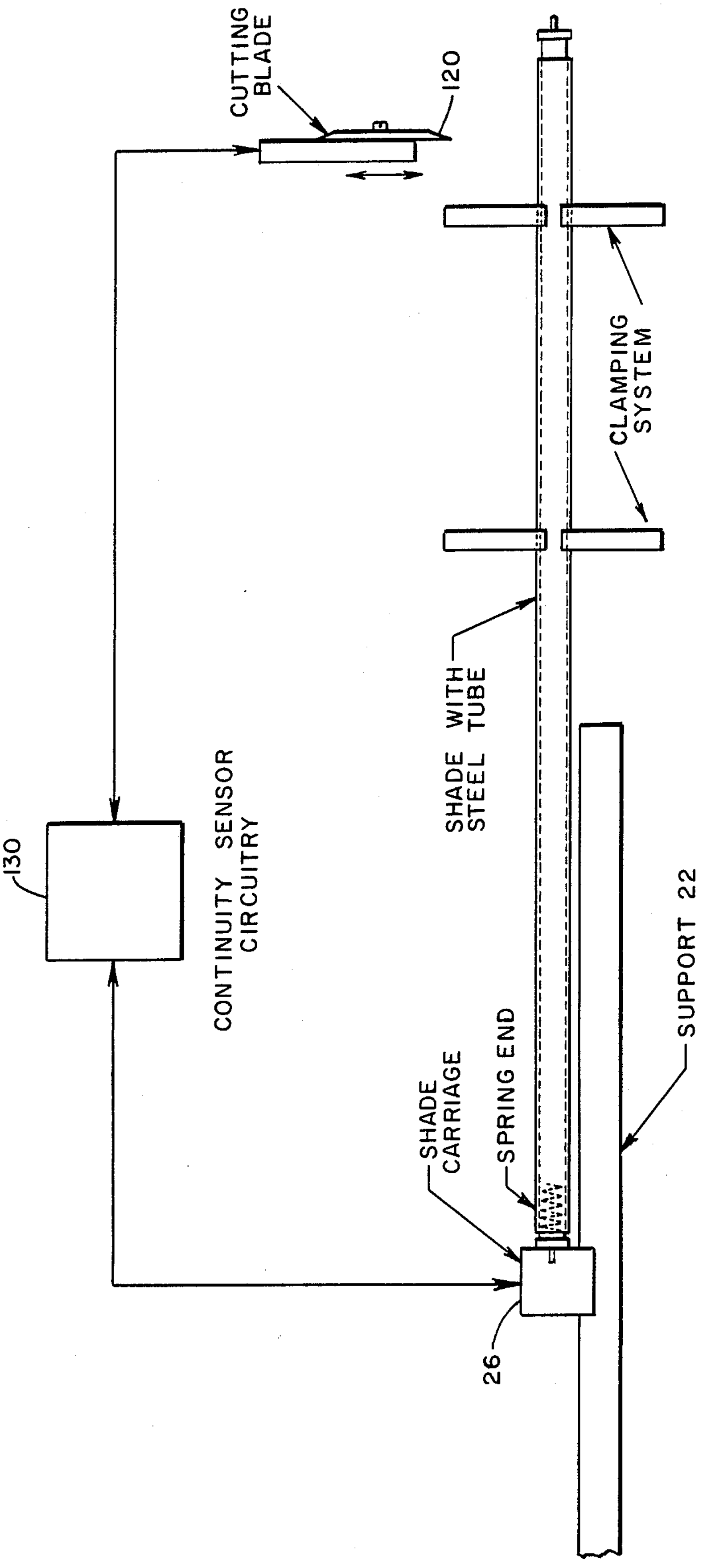
FIG. 6 is a schematic view of the cut-off device according to the present invention.

The second operation interruption control device is illustrated in FIG. 6, and comprises a continuity sensor circuit. This circuit is for use when the vinyl shade to be cut is mounted on a metal roller. The tab of the roller is inserted into carriage assembly 26, as described earlier. This is electrically connected to a logic circuit 130, such as a National Controls model NS156 which is in turn wired to the blade 120. When the blade 120 cuts through the vinyl shade and contacts the metal roller, a circuit is completed, and the logic circuit 130 sends out a delayed signal to shut off the motor 94 after the blade 120 completes one additional revolution around the roller (to ensure a complete cutting of the shade). Because the roller is usually made from a cold rolled soft metal, and the blade 120 is made from higher carbon, hardened steel, contact between the blade 120 and the roller does not significantly harm the blade.

On the other hand, in the event that the blade becomes dull, it may simply be rotated a few degrees until a new surface of the blade is exposed to the roller. Since the blade does not rotate with respect to the wheel 100 or blade holder 112, only one small portion of the blade 120 becomes worn at a time.

Thus, when a convoluted cardboard roller is inserted in the machine, the blade 120 will cut all the way through the vinyl shade and the cardboard roller and is stopped by proximity sensors 124, 126. When cutting a shade on a metal roller, the blade 120 only cuts through the shade itself and is stopped at the metal roller by circuit 130. The metal roller is usually made in a telescoping construction and is simply pressed together to make it smaller to match the trimmed vinyl.

The third operation interrupting device device is a timer switch 132 that is connected to the motor 94. Switch 132 is set to turn off the motor 94 after it has been running for a predetermined period of time, if the motor 94 has not previously been turned off by one of the other two controls. The third control acts as a safety to prevent damage to the roller, the machine, or the user in the event something goes wrong.

Sequence of Operation: To use the cutting machine of the present invention, the user places the shade to be cut into the V-shaped support 22. The tab projecting from the end of the roller is inserted into opening 36 in carriage assembly 26, which is adjusted to the desired length of the shade. The start button 16 is then depressed.

Upon pressing of the start button 16, the clamp motor 82 is activated, and after a brief delay, the clutch 80 engages the shaft 72 for one-half of a revolution. This one-half revolution of shaft 72 moves the cams 76 such that springs 68 are able to move mounting plates 44, 46, 48, 50 and their jaws 40, 42 together to clamp the roller in two places.

When the cams 76 are in the jaw closing position, cam 90 activates switch 92 to send a signal to motor 94 to start. As motor 94 spins wheel 100, the weight 110 pulls by centrifugal force the blade 120 against the shade and roller which is extended through opening 116 in the wheel. The blade 120 moves inwardly cutting the vinyl shade until the blade 120 contacts a metal roller or moves in a pre- determined distance. If neither of those events happen, the third operation interrupting control will stop motor 94 within a predetermined time, usually twenty to thirty seconds. When the motor 94 stops, springs 114 retract the blade away from the roller being cut.

After the motor 94 stops, there is a few second delay before the clutch 80 engages motor 82 to shaft 72 for another one-half revolution turn. This turn moves the cams 76 against plates 78 and forces the mounting plates and their jaws away from the roller. The roller with the cut vinyl shade may then be removed.

Although only preferred embodiments are specifically illustrated and described herein, it will be appreciated that many modifications and variations of the present invention are possible in light of the above teachings and within the purview of the appended claims without departing from the spirit and intended scope of the invention.

What we claim is:

1. A device for automatically cutting window shades mounted on a roller, comprising:

base means supporting the operative components of said device at a convenient working level;

means, supported from said base means, for cutting the shade, which means comprises:

a wheel having two lateral faces and walls centrally defining an opening on the rotational axis thereof, and mounting blocks disposed on opposite sides of said opening;

parallel shafts extending slidably through said mounting blocks;

cutting blade means mounted on said parallel shafts on one side of the rotational axis of the wheel for radial movement relative thereto;

means for drawing the cutting blade means toward the rotational axis of the wheel, said drawing means comprising a weight mounted on said shafts adjacent the ends thereof disposed on the opposite side of the axis of rotation of said wheel from said cutting blade means; whereby when said wheel rotates, centrifugal force acting on the weight draws the cutting blade toward the rotational axis of the wheel;

means for restraining radial movement of the cutting blade toward the rotational axis of the wheel, comprising spring means acting against the centrifugal force and the weight so as to urge the cutting blade away from the rotational axis of the wheel when the wheel is rotating at less than a predetermined speed;

means, supported from said base means, and operatively connected to said wheel, for driving said wheel;

means, mounted on said base means, for mounting the roller and shade concentrically to said wheel within said opening along the axis of rotation thereof and for stabilizing said roller and shade during the cutting operation at a predetermined point along said shade and roller;

first means for interrupting the operation of the cutting means responsive to contact by the cutting blade means with a metal shade roller, comprising means for disengaging said drive means, and time delay means adapted to defer the operation of said disengaging means until the cutting means shall have completed one additional revolution around the roller;

second means for interrupting the operation of the cutting means responsive to a predetermined radial movement of said cutting blade means, said second means comprising proximity sensing means mounted on said weight and on the support of said cutting device adapted to detect when said weight has travelled a predetermined distance, and to activate said means for disengaging said drive means in response to such a detection.

2. The cutting device according to claim 1, wherein the first interrupting means includes an electrical continuity sensor arranged such that an electrical circuit is completed when the cutting blade contacts a metal roller.

3. The cutting device according to claim 2, further comprising carriage assembly means for holding the end of the shade and roller not being cut, said carriage assembly means being slidably adjustable to maneuver the shade and roller into a predetermined position for cutting, and wherein said carriage assembly comprises part of the first means for interrupting the cutting means.

4. A method for automatically cutting a window shade mounted on a roller, comprising:

clamping the roller and shade in a stabilized position;

generating a first signal when said roller and shade are clamped;

cutting the window shade in response to said first signal by revolving a cutting means around the shade and moving said cutting means into and through said shade;

stopping the cutting means in response to the first to occurr of two possible signals, one of which being generated by means of an electrical circuit which is completed by contact between said cutting means and a metal shade roller, and the other of which being generated by means for sensing when said cutting means has travelled a predetermined distance toward the axis of said roller.

5. A method for automatically cutting a window shade mounted on a roller, comprising:

clamping the roller and shade in a stabilized position;

generating a first signal when said roller and shade are clamped;

cutting the window shade in response to said first signal by revolving a cutting means around the shade and moving said cutting means into and through said shade;

generating either a metal contract control signal if the cutting means contacts a metal shade roller or a distance travelled control signal when the cutting means has travelled a predetermined distance;

stopping the cutting action of the cutting means in response to said metal contact control signal, the one revolution of said cutting means after the metal contact control signal is generated; and stopping the cutting action of the cutting means in response to said distance travelled control signal, if it is not already being stopped in response to an earlier metal contact control signal.

* * * * *